United States Patent
Davydov et al.

(10) Patent No.: US 10,608,860 B2
(45) Date of Patent: Mar. 31, 2020

(54) DEVICE AND METHOD FOR ENHANCED SEAMLESS MOBILITY

(71) Applicant: Intel Corporation, Santa Clara, CA (US)

(72) Inventors: Alexei Davydov, Nizhny Novgorod (RU); Hyejung Jung, Palatine, IL (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/756,189

(22) PCT Filed: Dec. 15, 2015

(86) PCT No.: PCT/US2015/065720
§ 371 (c)(1),
(2) Date: Feb. 28, 2018

(87) PCT Pub. No.: WO2017/044142
PCT Pub. Date: Mar. 16, 2017

(65) Prior Publication Data
US 2018/0248736 A1    Aug. 30, 2018

Related U.S. Application Data

(60) Provisional application No. 62/217,623, filed on Sep. 11, 2015.

(51) Int. Cl.
*H04L 27/26* (2006.01)
*H04B 7/024* (2017.01)
(Continued)

(52) U.S. Cl.
CPC ......... *H04L 27/2655* (2013.01); *H04B 7/024* (2013.01); *H04J 11/0079* (2013.01);
(Continued)

(58) Field of Classification Search
CPC ... H04W 72/042; H04W 48/12; H04W 48/16; H04W 48/18; H04W 36/08; H04W 36/14;
(Continued)

(56) References Cited

U.S. PATENT DOCUMENTS

2009/0028112 A1   1/2009  Attar et al.
2012/0207040 A1   8/2012  Comsa et al.
(Continued)

OTHER PUBLICATIONS

"International Application Serial No. PCT/US2015/065720, International Search Report dated Jun. 9, 2016", 3 pgs.
"International Application Serial No. PCT/US2015/065720, Written Opinion dated Jun. 9, 2016", 5 pgs.
Naizheng, Zheng, "Multi-Cell Uplink Radio Resource Management", Department of Electronic Systems, Aalborg University, [Online] retrieved from the internet:http://vbn.aau.dk/files/52387180/phdthesis_Final.pdf, (2011), 83-113.

*Primary Examiner* — Paul H Masur
(74) *Attorney, Agent, or Firm* — Kowert, Hood, Munyon, Rankin & Goetzel, P.C.

(57) ABSTRACT

Devices and methods of determining offsets for different eNBs in a dynamic switched CoMP network are generally described. A UE may receive, in an RRCConnectionReconfiguration message, DL parameter sets associated with different eNBs and having reference signal information for a PSS, SSS and DRS. The UE may receive reference signals based on the DL set associated with the eNB and determine a timing/frequency offset based on the reference signals. The offsets may be used to decode a dynamically switched PDSCH indicated by a PDCCH. The DL sets may indicate which PDCCH to detect or the PDCCH from the same eNB may be used and the PDSCH determined from a DCI in the PDCCH. A UL DCI may indicate which of UL parameter sets to use. The UL sets may indicate a reference signal to determine path loss and a timing advance value.

25 Claims, 6 Drawing Sheets

(51) Int. Cl.
   *H04J 11/00* (2006.01)
   *H04W 76/27* (2018.01)
   *H04W 48/12* (2009.01)
   *H04W 72/04* (2009.01)
   *H04L 5/00* (2006.01)
   *H04W 56/00* (2009.01)

(52) U.S. Cl.
   CPC ......... *H04W 48/12* (2013.01); *H04W 72/042* (2013.01); *H04W 76/27* (2018.02); *H04L 5/0023* (2013.01); *H04L 5/0035* (2013.01); *H04L 5/0048* (2013.01); *H04W 56/001* (2013.01)

(58) Field of Classification Search
   CPC . H04L 27/2655; H04L 5/0023; H04L 5/0035; H04L 5/0048; H04B 7/024; H04J 11/0079
   See application file for complete search history.

(56) References Cited

U.S. PATENT DOCUMENTS

| | | | |
|---|---|---|---|
| 2014/0140323 A1 | 5/2014 | Son et al. | |
| 2014/0241323 A1 | 8/2014 | Park et al. | |
| 2015/0124732 A1* | 5/2015 | Seo | H04B 7/0413 370/329 |
| 2015/0334762 A1* | 11/2015 | Yang | H04W 76/15 370/329 |
| 2017/0237535 A1* | 8/2017 | Park | H04L 5/0035 370/329 |

\* cited by examiner

DEVICE AND METHOD FOR ENHANCED SEAMLESS MOBILITY

PRIORITY CLAIM

This application is a U.S. National Stage Filing under 35 U.S.C. 371 from International Application No. PCT/US2015/065720, filed Dec. 15, 2015 and published in English as WO 2017/044142 on Mar. 16, 2017, which claims the benefit of priority to U.S. Provisional Patent Application Ser. No. 62/217,623, filed Sep. 11, 2015, and entitled "ENHANCED SEAM-LESS MOBILITY SUPPORT FOR LTE-A," each of which is incorporated herein by reference in its entirety.

TECHNICAL FIELD

Embodiments pertain to radio access networks. Some embodiments relate to the use of Coordinated Multipoint (CoMP) in cellular networks, including Third Generation Partnership Project Long Term Evolution (3GPP LTE) networks and LTE advanced (LTE-A) networks as well as $4^{th}$ generation (4G) networks and $5^{th}$ generation (5G) networks

BACKGROUND

With the increase in different types of devices communicating over networks to servers and other computing devices, usage of 3GPP LTE systems has increased. In particular, as the number and complexity of user equipment (UEs) has grown, users have demanded extended functionality and enhanced and varied applications. While the demand for telephony and messaging services has remained steady, the demand for data-intensive applications such as video streaming has continued to increase, increasing the desire for higher transmission rates and stressing network resources. To aid in serving UEs in 3GPP LTE networks using 4G and beyond, Coordinated Multipoint (CoMP) is being standardized.

However, in certain situations handover in CoMP networks may become problematic due to an extensive amount of offset, causing both downlink and uplink mobility-related issues.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
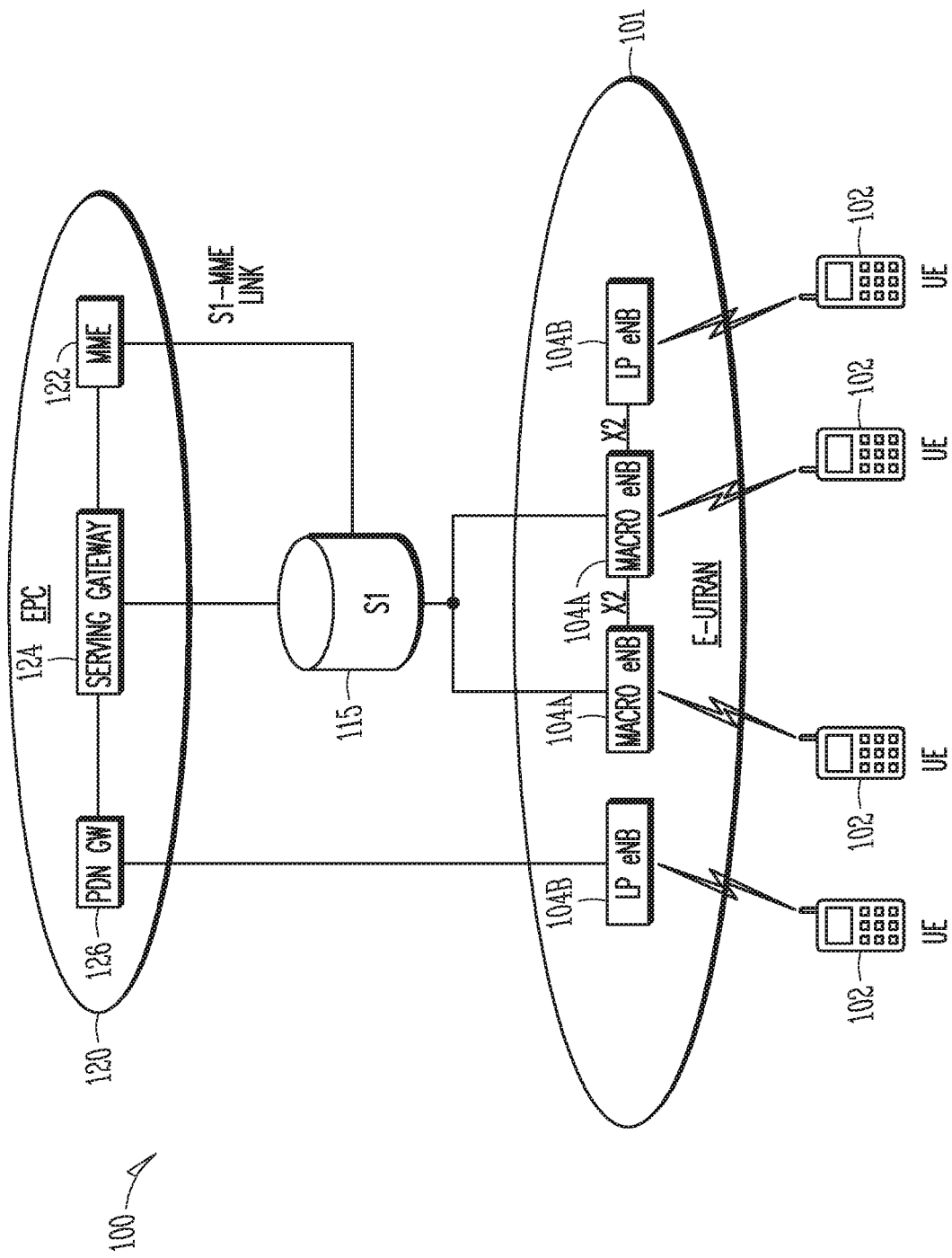
FIG. 1 is a functional diagram of a wireless network in accordance with some embodiments.

FIG. 1 shows an example of a portion of an end-to-end network architecture of a Long Term Evolution (LTE) network with various components of the network in accordance with some embodiments. As used herein, an LTE network refers to both LTE and LTE Advanced (LTE-A) networks as well as other versions of LTE networks to be developed. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example.

The core network 120 may include a mobility management entity (MME) 122, serving gateway (serving GW) 124, and packet data network gateway (PDN GW) 126. The RAN 101 may include evolved nodeBs (eNBs) 104 (which may operate as base stations) for communicating with user equipment (UE) 102. The eNBs 104 may include macro eNBs 104a and low power (LP) eNBs 104b. The term eNB and cell is used interchangeably herein. The eNBs 104 and UEs 102 may employ CoMP techniques as described herein.

The MME 122 may be similar in function to the control plane of legacy Serving GPRS Support Nodes (SGSN). The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes.

The PDN GW 126 may terminate a SGi interface toward the packet data network (PDN). The PDN GW 126 may route data packets between the EPC 120 and the external PDN, and may perform policy enforcement and charging data collection. The PDN GW 126 may also provide an anchor point for mobility devices with non-LTE access. The external PDN can be any kind of IP network, as well as an IP Multimedia Subsystem (IMS) domain. The PDN GW 126 and the serving GW 124 may be implemented in a single physical node or separate physical nodes.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells 104b may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the term LP eNB refers to any suitable relatively LP eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 104b might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB 104a via an X2 interface. Picocell eNBs or other LP eNBs LP eNB 104b may incorporate some or all functionality of a macro eNB LP eNB 104a. In some cases, this may be referred to as an access point base station or enterprise femtocell.

Communication over an LTE network may be split up into 10 ms frames, each of which may contain ten 1 ms subframes. Each subframe of the frame, in turn, may contain two slots of 0.5 ms. Each subframe may be used for uplink (UL) communications from the UE to the eNB or downlink (DL) communications from the eNB to the UE. In one embodiment, the eNB may allocate a greater number of DL communications than UL communications in a particular frame. The eNB may schedule transmissions over a variety of frequency bands ($f_1$ and $f_2$). The allocation of resources in subframes used in one frequency band and may differ from those in another frequency band. Each slot of the subframe may contain 6-7 OFDM symbols, depending on the system used. In one embodiment, the subframe may contain 12 subcarriers. A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. In Frequency Division Duplexed (FDD) mode, both the uplink and downlink frames may be 10 ms and frequency (full-duplex) or time (half-duplex) separated. In Time Division Duplexed (TDD), the uplink and downlink subframes may be transmitted on the same frequency and are multiplexed in the time domain. The duration of the resource grid 400 in the time domain corresponds to one subframe or two resource blocks. Each resource grid may comprise 12 (subcarriers)*14 (symbols)=168 resource elements.

Each OFDM symbol may contain a cyclic prefix (CP) which may be used to effectively eliminate Inter Symbol Interference, and a Fast Fourier Transform (FFT) period. The duration of the CP may be determined by the highest anticipated degree of delay spread. Although distortion from the preceding OFDM symbol may exist within the CP, with a CP of sufficient duration, preceding OFDM symbols do not enter the FFT period. Once the FFT period signal is received and digitized, the receiver may ignore the signal in the CP.

There may be several different physical downlink channels that are conveyed using such resource blocks, including the physical downlink control channel (PDCCH) and the physical downlink shared channel (PDSCH). Each subframe may be partitioned into the PDCCH and the PDSCH. The PDCCH may normally occupy the first two symbols of each subframe and carries, among other things, information about the transport format and resource allocations related to the PDSCH channel, as well as H-ARQ information related to the uplink shared channel. The PDSCH may carry user data and higher layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE.

The PDCCH may contain downlink control information (DCI) in one of a number of formats that tell the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE. In addition to receiving downlink transmissions, the UE 102 may transmit uplink information to an eNB 104a, 104b via a Physical Uplink Shared Channel (PUSCH). The PUSCH may carry RRC messages, Uplink Control Information (UCI) and data.

In addition to the PDCCH, an enhanced PDCCH (ePDCCH) may be used. The PDSCH may contain data in some of the RBs and the ePDCCH may contain the downlink control signals in others of the RBs of the bandwidth supported by the UE 102. Different UEs may have different ePDCCH configurations. The sets of RBs corresponding to ePDCCH may be configured, for example, by higher layer signaling such as Radio Resource Control (RRC) signaling for ePDCCH monitoring.

Periodic reference signaling messages containing reference signals may occur between the eNB and the UEs. The downlink reference signals may include cell-specific reference signal (CRS) and UE-specific reference signals. The CRS may be used for scheduling transmissions to multiple UEs, channel estimation, coherent demodulation at the UE and handover. CRS may, however, be usable only with 2 or 4 antennas. CRS may be transmitted in each sixth subcarrier during the first and fifth OFDM symbols of each slot when the short CP is used and during the first and fourth OFDM symbols when the long CP is used. Other reference signals may include a channel state information reference signal (CSI-RS) used for measurement purposes, and a Discovery Reference Signal (DRS) specific to an individual UE. CSI-RS are relatively sparse, occur in the PDSCH and are antenna dependent. The Primary Synchronization Signal (PSS) and Secondary Synchronization Signal (SSS) may be used by the UE to identify the cell using the physical cell ID (PCID), the current subframe number, slot boundary, and duplexing mode. The PSS and SSS may be sent in the center 1.08 MHz of the system bandwidth used by the eNB in a broadcast to all UEs in symbol periods 6 and 5, respectively, in each of subframes 0 and 5 of each radio frame with a normal CP. Multimedia Broadcast Multicast Service Single Frequency Network (MBSFN) reference signals used to provide Evolved Multimedia Broadcast Multicast Services (eMBMS) to the UE.

The above and other periodic messages thus not only provide information regarding the communication channel, but also enable tracking in time and/or frequency of communications with the UE. The uplink reference signals may include Demodulation Reference Signals (DM-RS), which may be used to enable coherent signal demodulation at the eNB. DM-RS may be time multiplexed with uplink data and transmitted on the fourth or third symbol of an uplink slot for normal or extended CP, respectively, using the same bandwidth as the data. Sounding Reference Signals (SRS) may be used by UEs with different transmission bandwidth to allow channel dependent uplink scheduling and may typically be transmitted in the last symbol of a subframe.

The eNBs 104 and UEs 102 may employ CoMP for transmission and reception. In downlink CoMP, the eNBs 104 may provide overlapping coverage and may coordinate transmissions to a UE 102. In uplink CoMP, the reception of UE signals may be coordinated among the eNBs 104 to improve network performance at cell edges. In some embodiment, the eNBs 104 providing the overlapping coverage may be a homogeneous set of macro eNBs 104*a* while in other embodiments the eNBs 104 may be heterogeneous, including a macro eNB 104*a* and a LP eNB 104*b*. The eNBs 104 may be geographically separated but dynamically coordinated through a high-speed backhaul to provide joint scheduling and transmissions as well as proving joint processing of the received signals.

CoMP may be employed in different techniques, which include Joint Processing, Dynamic Point Selection and Coordinated scheduling/beamforming. In Joint Processing, the eNBs 104 may transmit data on the same frequency in the same subframe and/or uplink transmissions from the UE 102 may be received by the eNBs 104 and combined to improve the signal quality and strength and perhaps actively cancel interference from transmissions that are intended for other UEs. This may increase the amount of data in the network dependent upon how many eNBs 104 transmit the data. Uplink transmissions from the UE 102 may be detected by antennas at the different eNBs 104, which may form a virtual antenna array. The signals received by the eNBs 104 may be combined and processed to increase the strength of low strength signals or those masked by interference. In Dynamic Point Selection, data may available for transmission at multiple eNBs 104 but only scheduled from eNB 104 in each subframe. In Coordinated scheduling/beamforming, each eNB 104 in the CoMP area may transmit data to the UE 102 in different subframes while scheduling decisions as well as beam coordination are coordinated among the eNBs 104. In some embodiments, blanking or muting of signals from one eNB 104 may be used when another eNB is transmitting to decrease interference.

Figure 2:
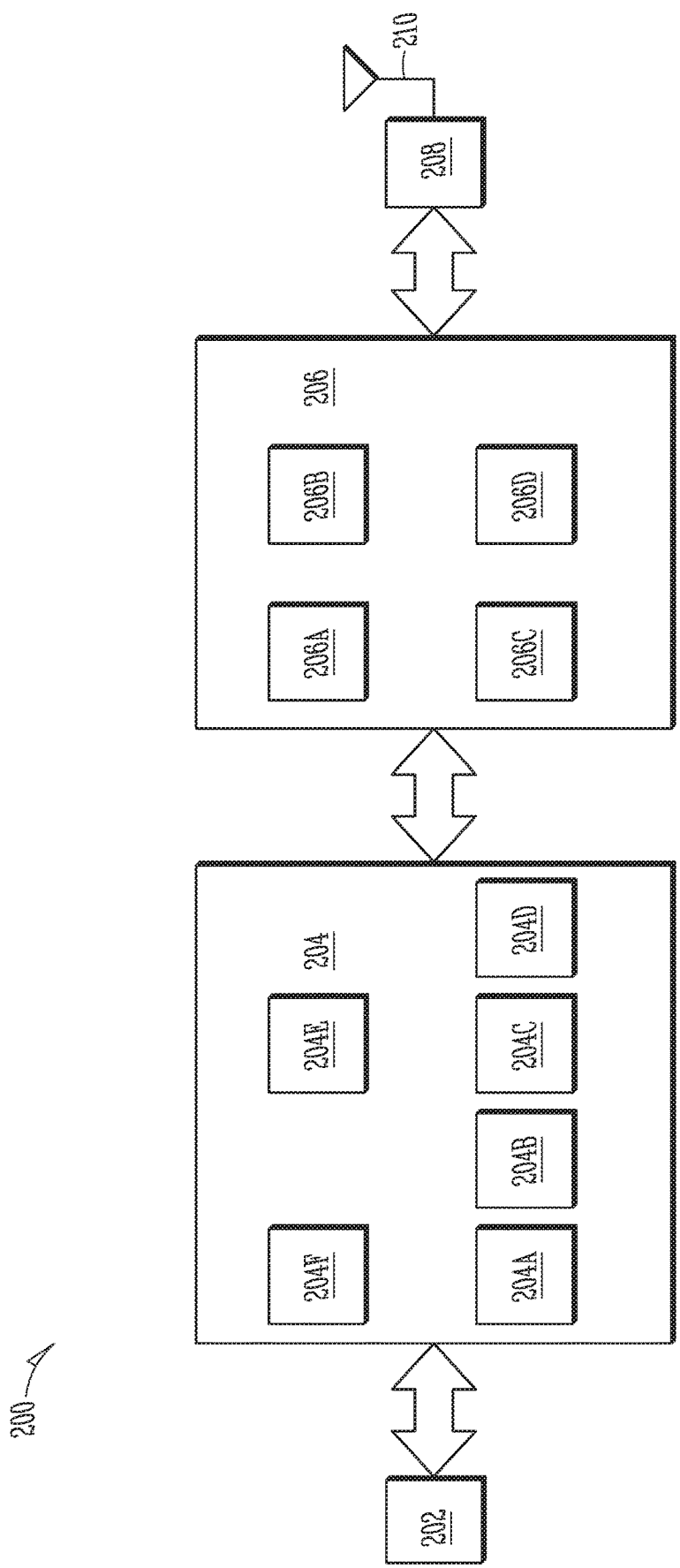
FIG. 2 illustrates components of a communication device in accordance with some embodiments.

Embodiments described herein may be implemented into a system using any suitably configured hardware and/or software. FIG. 2 illustrates components of a UE in accordance with some embodiments. At least some of the components shown may be used in an eNB or MME, for example, such as the UE 102 or eNB 104 shown in FIG. 1. The UE 200 and other components may be configured to use the CoMP framework as described herein. The UE 200 may be one of the UEs 102 shown in FIG. 1 and may be a stationary, non-mobile device or may be a mobile device. In some embodiments, the UE 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as the eNB may contain some or all of the components shown in FIG. 2. Other of the network elements, such as the MME, may contain an interface, such as the S1 interface, to communicate with the eNB over a wired connection regarding the UE.

The application or processing circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include FFT, precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or RRC elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (Wi-Max), IEEE 802.11 wireless technology (WiFi) including IEEE 802 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the UE 200 may include additional elements such as, for example, memory/storage, display, camera, sensor, and/or input/output (I/O) interface as described in more detail below. In some embodiments, the UE 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 200 may include one or more user interfaces designed to enable user interaction with the system and/or peripheral component interfaces designed to enable peripheral component interaction with the system. For example, the UE 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
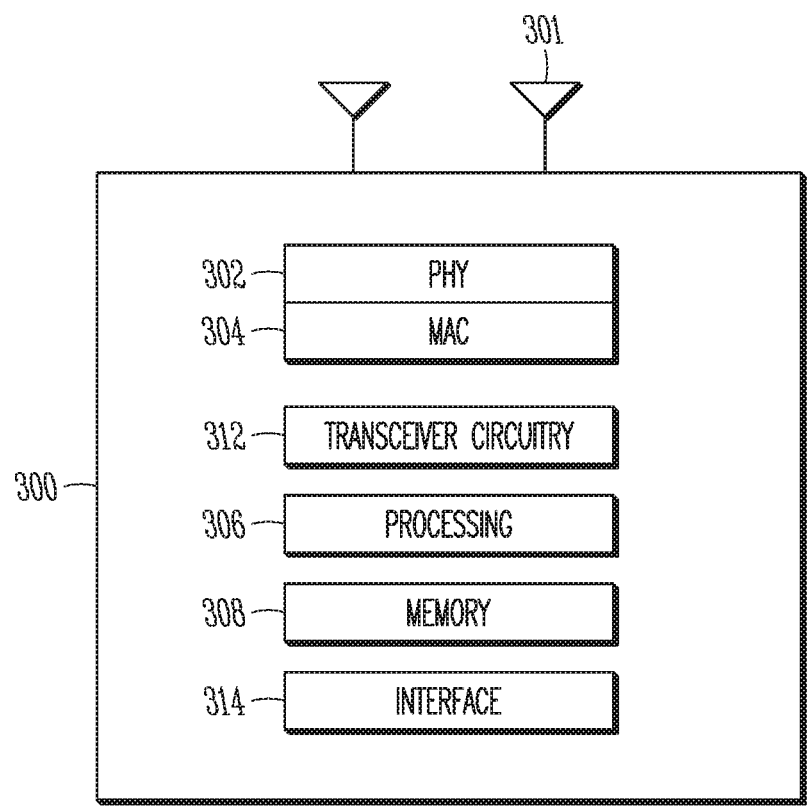
FIG. 3 illustrates a block diagram of a communication device in accordance with some embodiments.

FIG. 3 is a block diagram of a communication device in accordance with some embodiments. The device may be a UE or eNB, for example, such as the UE 102 or eNB 104 shown in FIG. 1 that may be configured to use dynamic switching in a CoMP network as described herein. The physical layer circuitry 302 may perform various encoding and decoding functions that may include formation of baseband signals for transmission and decoding of received signals. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 300 can be configured to operate in accordance with 3GPP standards or other protocols or standards, including WiMax, WiFi, GSM. EDGE, GERAN, UMTS, UTRAN, or other 3G, 3G, 4G, 5G, etc. technologies either already developed or to be developed. The communication device 300 may include transceiver circuitry 312 to enable communication with other external devices wirelessly and interfaces 314 to enable wired communication with other external devices. As another example, the transceiver circuitry 312 may perform various transmission and reception functions such as conversion of signals between a baseband range and a Radio Frequency (RF) range.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs. RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 4:
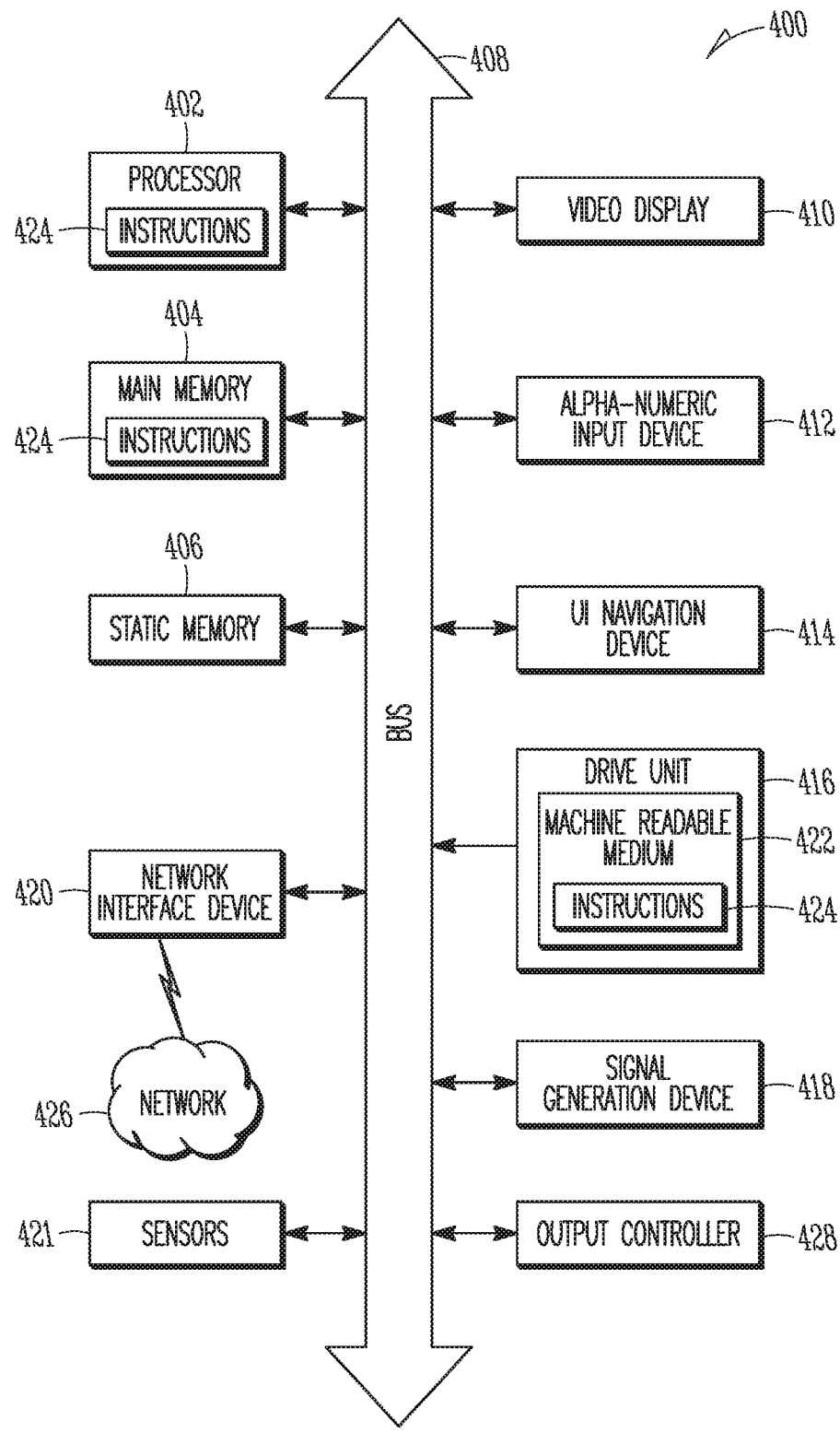
FIG. 4 illustrates another block diagram of a communication device in accordance with some embodiments.

FIG. 4 illustrates another block diagram of a communication device in accordance with some embodiments. In alternative embodiments, the communication device 400 may operate as a standalone device or may be connected (e.g., networked) to other communication devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

Figure 5:
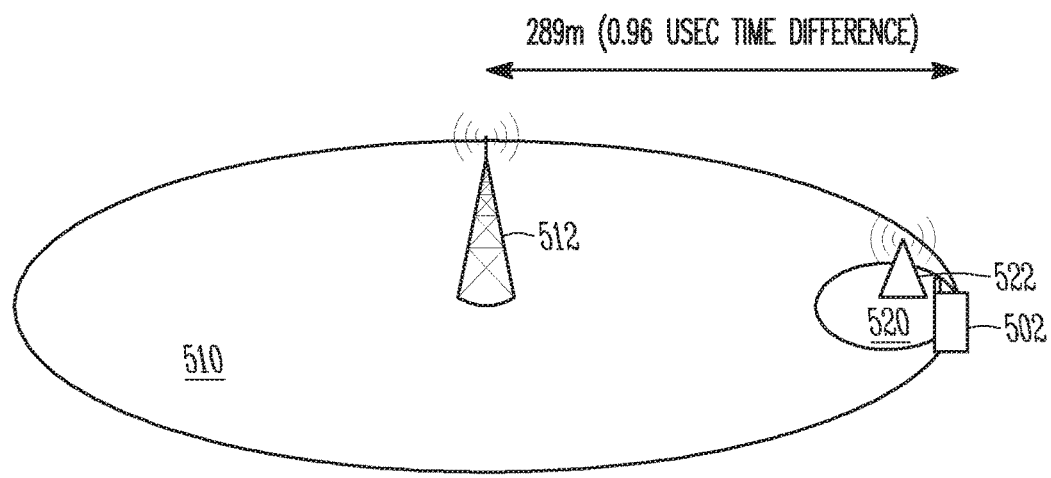
FIG. 5 is a functional diagram of a wireless network using CoMP in accordance with some embodiments.

FIG. 5 is a functional diagram of a wireless network using CoMP in accordance with some embodiments. Specifically, FIG. 5 illustrates an example of CoMP scenario 3, a heterogeneous network in which a macro eNB 512 having a macro cell 510 coverage area and a LP eNB 522 having a LP cell 520 coverage area have different cell-IDs. While a UE 502 in the CoMP network may synchronize with one eNB (the synchronization source), in practice communications between the UE and a different eNB (the transmission point) may encounter a time and/or frequency mismatch even if the eNBs themselves are synchronized. This mismatch may be extensive in situations in which there is a large difference in propagation delays between the synchronization source and the transmission point.

As above, CoMP with single FFT processing may be used to provide seamless mobility support for UEs in an LTE system. A UE 502 in the downlink first synchronizes with a single eNB 512 using CRS transmitted by the eNB 512. This eNB may be referred to as the synchronizing source or serving cell. The synchronizing eNB is typically a macro eNB 512. The UE 502 may also receive data when in a LP cell 520 from a LP eNB 522, which, as above may be a micro, pico or nano eNB. Although in FIG. 5, the macro eNB 512 is shown as the eNB, in some embodiments the eNB may be a remote radio head (RRH) with a fiber connection to the macro eNB 512. The RRH may have the same physical cell ID (PCI) as the macro eNB 512.

Transmission point switching to support seamless UE mobility may be provided by dynamic point selection, where a combination of RRC and DCI signaling may be used to indicate the transmission point (the eNB from which the UE is currently receiving data). A potential time and frequency mismatch between synchronization source and the transmission point may be handled in the frequency domain without changing pre-FFT synchronization. At the same time, post-FFT compensation may limit the possible deployment scenarios where such seamless mobility can be supported. For example, in accordance with Technical Report 38.819 in the context of Release 11 regarding downlink CoMP. UE performance requirements were defined by assuming timing offset in the range [−0.5, 2] sec, where a substantial portion of the received signal is within the CP. In situations in which dynamic switching is used, timing offsets outside of this range (i.e., a timing advance of 0.5 sec or timing delay of 2 μsec) may lead to inter-symbol interference and corrupt the received symbols. Timing offset for dynamic switching may include differences in synchronization of the eNBs 512, 522 as well as propagation delays between the eNBs 512, 522 in transmissions between the eNBs 512, 522 and the UE 502. For a given symbol transmitted by the eNBs 512, 522, a timing offset may correspond to a time difference in the symbol as received by the UE 502, which may translate to a phase ramp in the frequency domain after FFT processing.

Even if the eNBs 512, 522 are perfectly synchronized using a high-speed backhaul, the timing offsets may correspond, as shown in FIG. 5, to the maximum difference of the propagation delays between the synchronization source (e.g., macro eNB 512, also referred to herein as the serving cell) and the transmission point (e.g., pico eNB 522) is equal to 0.96 μs, when the cell radius=289 m (where the inter-site distance (ISD)=500 m). Increasing the coverage area of the macro cell 510 to a cell radius >600 m would not allow support of seamless mobility using the legacy downlink CoMP framework; the handover procedure would introduce interruption. Similarly, the legacy uplink transmission also targets a single reception point and is not substantially optimized to support seamless mobility.

The UE 502 may have the baseband capability for multiple FFT processing. In particular, this capability may be used to support carrier aggregation and dual connectivity, which may allow support of multi-link connectivity at the UE 502 through dynamic switching. However, unlike carrier aggregation, in which different symbols in multiple frequency bands may be received simultaneously and FFT processed, symbols in the same frequency band may be independently received from the different eNBs 512, 522 and FFT processed using different timing offsets. This may permit an increase the range of the macro cell 510 without substantially affecting mobility as the UE 502 may perform control channel monitoring, PDSCH reception and PUSCH transmission using multiple synchronization sources and reception points with more than one pre-FFT processing.

More specifically, as indicated above, each eNB 512, 522 may transmit a variety of signals including higher layer control signals in RRC transmissions, cell-specific control signals in PDCCH or ePDCCH transmissions, reference signals and data in PDSCH transmissions. The reference signals may include CRS, which may take one of a number of patterns as transmitted by each eNB 512, 522. In some embodiments, the PDSCH may be transmitted within OFDM symbols that are not used in any of the cells 510, 520 for PDCCH transmission. Similarly, the CRS pattern transmitted by each eNB 512, 522 may be shifted in frequency according to the cell ID of that eNB, such that 3 of the 6 shifts provide non-overlapping CRS patterns. This permits reception of CRS signals for measurement and feedback by the UE 502 to the appropriate eNB 512, 522. The measurement of the CRS signals may permit the UE 502 to measure the timing offset and adjust the FFT processing accordingly.

To effect this, the serving cell 512 may initially transmit to the UE 502 control information parameters for one or more other cells, such as transmission point 522. The parameters may be provided in higher layer signaling, such as via an RRC message during the RRC connection process in which the UE 502 initially attaches to the serving cell 512, e.g., when the UE 502 first powers on or is handed over to the serving cell 512. The control information parameters may be provided, for example, via an RRCConnectionReconfiguration message from the serving cell 512 to the UE 502. In some embodiments, the control information parameters in the RRC message may additionally include the parameters of an ePDCCH, such as occupied physical resources of the ePDCCH and one or more reference signal parameters of the ePDCCH. The control information parameters in the RRC message may include a PCID and corresponding control information about the PSS and SSS and CSI-RS/DRS for the serving cell 512 and one or more other cells. The control information parameters for a particular cell may also be referred to as a PDCCH set. Thus, the UE 502 may be able to monitor for the control and reference signals for a plurality of cells.

In some embodiments, the RRC message may include the control information parameters of all neighboring cells. In some embodiments, the RRC message may include the control information parameters of only those cells configured to provide dynamic switching with the serving cell 512. In some embodiments, the RRC message may include the control information parameters of only those cells configured to provide dynamic switching with the serving cell 512.

In some embodiments, the control information parameters provided in the RRC message may be dependent on the configuration of the network. For example, control information parameters for more cells may be provided in a network with a denser cell distribution than in a network with a sparser cell distribution. In another example, control information parameters for more cells may be provided in a local network, such as within a confined area such as a store or shopping area, than in a non-local network, such as outdoors, even if the cell distribution in the non-local network is denser than the local network.

In some embodiments, the control information parameters provided in the RRC message may be independent of characteristics of the UE 502, while in other embodiments provided the control information parameters may be dependent on characteristics of the UE 502. For example, if the UE 502 is a machine-type communication UE (MTC UE) and is non-mobile, the serving cell 512 may decide not to include the control information parameters of other cells in the RRC message. Similarly, if the serving cell 512 determines that the UE 502 is moving slowly relative to the distance to other cells, from location data provided by the UE 502 or changes in signal strength for example, the serving cell 512 may decide not to include the control information parameters of other cells in the RRC message. The control information parameters in the RRC message may be periodically or aperiodically updated, for example, as with a change in cell status (e.g., a neighboring cell becomes active or inactive) or a change in the UE state (e.g., a change in the speed).

Figure 6:
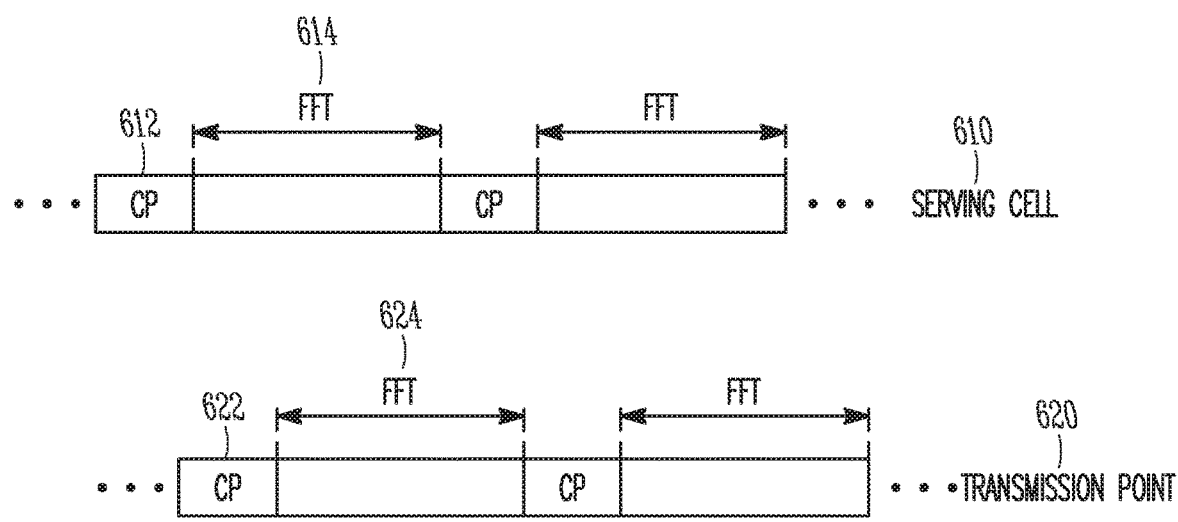
FIG. 6 illustrates CoMP using multiple Fast Fourier Transform (FFT) processes in accordance with some embodiments.
Figure 7:
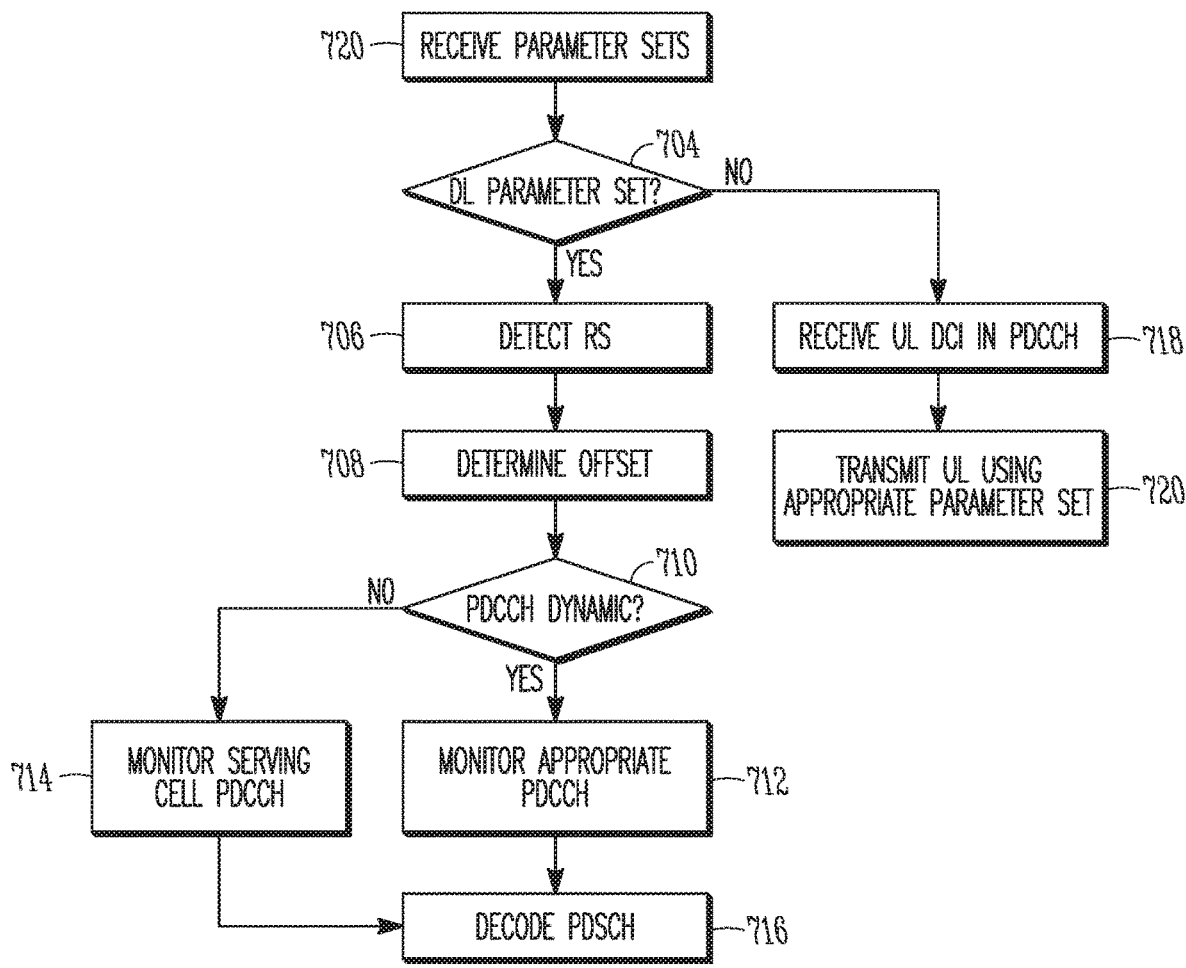
FIG. 7 illustrates a flowchart of a method of physical downlink control channel (PDCCH) reception in accordance with some embodiments.

FIG. 7 illustrates a flowchart of a method of physical downlink control channel (PDCCH) reception in accordance with some embodiments. FIG. 7 may illustrate the operations of one or more of the UE and eNBs shown in FIGS. 1-6. At operation 702, the UE 502 may attach to a serving cell 512 and receive one or more parameter sets. Each parameter set may be received in an RRC message. The RRC message may be an RRCConnectionReconfiguration message, for example.

At operation 704, the UE 502 may determine whether the parameter sets include downlink (DL) parameter sets or an uplink (UL) parameter sets. In some embodiments, both DL and UL parameter sets are included in the RRC message. In other embodiments, only DL or only UL parameter sets are included in the RRC message. As indicated above, the parameter sets may be updated from time to time, either periodically or aperiodically, and may change not only parameters within the existing type (DL/UL) of parameter sets but in addition, or instead, may change between types of parameter sets. Each DL parameter set may include a PCID for a particular cell, along with PSS and SSS and DRS configuration information for the particular cell. The DRS configuration information may include, for example, CSI-RS parameters for the particular cell. Each UL parameter set, on the other hand, may include PUSCH and/or SRS configuration information for the particular cell.

In response to the RRC message containing DL parameter sets, the UE 502 may use the parameters in the RRC message to monitor for and detect reference signals (RS) from the cells at operation 706. In some embodiments, the UE 502 may detect a PSS and SSS along with the PCID of the serving cell 512 and/or the transmission point 522. The UE 502 may also detect the DRS of the serving cell 512 and/or the transmission point 522.

Using the DRS, at operation 708 the UE 502 may measure the timing and frequency offset associated with each of the serving cell 502 and the transmission point 522. In some embodiments, the UE 502 may also use the PSS and SSS to aid in the measurement. The UE 502 may then adjust the FFT window for each FFT of the UE 502 configured to process signals respectively from the serving cell 512 and the transmission point 522 based on a timing estimation from the reference signal such that the measured timing offset is within the −0.5 to 2 μsec. The UE 502, however, may not be aware directly about the offset errors relative to the OFDM symbol boundary. As is evident, the timing offset for FFT processing of signals from the transmission point 522 may be different from the timing offset for FFT processing of signals from the serving cell 512.

In some embodiments, the offset determination is performed once, at the time the UE 502 initially detects the reference signals from a particular cell. In this embodiment, once the offsets have been measured, the UE 502 may continue to use the measured offsets of the particular cell so long as the UE 502 is communicating with the particular cell. In some embodiments, the UE 502 may continue to measure the reference signals to periodically or aperiodically update the offsets. Aperiodic updating of the particular cell may occur due to an event at the UE 502 and/or the particular cell, for example when either is powered down or in the event that the UE 502 is moving rapidly in relation to the range of the particular cell (or changes velocity substantially). The UE 502 may also provide reporting to the particular cell or to all cells, for example, to indicate channel conditions and other information to the cell. In some embodiments, the report may include the timing offsets measured by the UE 502. Once the offsets have been measured, the UE 502 may store the offsets in memory to use in PDCCH or PDSCH reception, as desired.

At operation 710, the UE 502 may determine whether the PDCCH transmission is dynamically switched (along with the PDSCH) or static. This is to say that the UE 502 may determine whether the DL parameter sets include parameters to determine which PDCCH to monitor (e.g., either the serving cell 512 or the transmission point 522) for PDSCH detection or whether the DL parameter sets include parameters to determine which PDSCH to monitor (e.g., either the serving cell 512 or the transmission point 522). Note that although PDCCH transmissions are referred to, the UE 502 may monitor for ePDCCH transmissions in addition to or instead of the PDCCH transmissions.

In some embodiments, the PSS and SSS may include an index that indicates which parameter set to use for PDCCH reception. In response to determining at operation 710 that the PDCCH is dynamic, the UE 502 may at operation 712 monitor the appropriate PDCCH depending on the index. In some embodiments, the UE 502 may determine from the PDCCH which PDSCH to decode. The UE 502 may thus determine at operation 512 that the PDCCH and consequently PDSCH of the serving cell 512 is to be monitored and decoded, or that the PDCCH and consequently PDSCH of the transmission point 522 is to be monitored and decoded.

In response to determining at operation 710 that the PDCCH is static, the UE 502 may at operation 714 monitor only the PDCCH of a single cell of all of the PDCCHs in the network. For example, in some embodiments, the UE 502 may monitor only the PDCCH of the serving cell 512. In this embodiment, the UE 502 may disregard the PDCCH of the transmission point 522 as the PDCCH of the transmission point 522 is not used. Despite monitoring only one PDCCH, however, the PDSCH may be dynamically switched among the cells. Thus, it may be desirable for the UE 502 to resolve which PDSCH to decode for the particular PDCCH detected. The PDCCH may include a DCI that permits the UE 502 to find and decode the PDSCH. The DCI may be in any DCI format, depending on the desired transmission characteristics of the communication link between the UE 502 and the cell transmitting the PDSCH. The DCI may contain one or more bits in a new PDSCH field to indicate the PDSCH for the UE 502 to monitor. Thus, the UE 502 may extract the bits in the PDSCH field, and to determine the appropriate PDSCH to decode.

At operation 716, the UE 502 may decode the appropriate PDSCH. The appropriate PDSCH is determined independent of whether the PDCCH is dynamic or static, and thus whether the parameter set or the PDCCH indicates which PDSCH to decode. The UE 502 may thus decode the PDSCH using the PDCCH at operation 712 or operation 714.

In response to determining, at operation 704, that the parameter set includes UL PUSCH parameter sets for the different cells, the UE 502 may store the UL PUSCH parameter sets in memory. The UL parameters in the UL PUSCH parameter sets may include parameters to use for transmissions by the UE 502 to each cell. Each UL set may thus target a specific UL reception point and include UL parameters describing the UL transmission. Subsequently, the UE 502 may at operation 718 receive an UL DCI in a PDCCH. In this case, the UE 502 may or may not have already determined the offsets for DL communication with the different cells.

In communicating UL data to the network, it may be desirable for the UE 502 to estimate an appropriate transmit power to use as well as a timing advance for each cell. Using excessive transmit power may unnecessarily reduce battery life of the UE 502 and may interfere with the communications of other UEs, while using too little transmit power may entail additional repeated transmissions to the cell to allow the cell to build up the signal strength for detection of the symbol, if possible. Timing advance may be used to adjust for propagation delay among UEs having different distances from a particular eNB. The Timing Advance (TA) may be equal to twice the propagation delay between a UE and the eNB, assuming that the same propagation delay value applies to both DL and UL communications. The eNB may continuously measure timing of UL signals from each UE and adjust the uplink transmission timing by sending the value of Timing Advance to the respective UE based on uplink data (PUCCH/PUSCH/SRS). The eNB may estimate the arrival time, which can then be used to calculate the TA value. The eNB may estimate the initial TA from the PRACH, which may be used as timing reference for uplink during initial access by the UE, radio link failure or handover, sent by the UE. The eNB may send a TA command in a Random Access Response (RAR). Once the UE is in connected mode, the eNB may continue to estimate the TA and send a TA Command MAC Control Element to the UE if correction is desired.

The UE 502 may generally estimate the transmit power to the different cells from the path loss. The path loss may be determined by the UE 502 using signal strength of reference signals received at the UE 502 as measured by the UE 502 and the transmit power of the eNB, which may be provided to the UE 502. The DCI received by the UE 502 may contain a power parameter that indicates to the UE 502 whether to increase or decrease the transmission power to the eNB by a preset increment. To achieve a substantial transmission power difference, the power of the UE 502 may be adjusted by repeatedly transmitting a PDCCH for the UE 502 containing a DCI in which the power parameter increases or decreases the transmission power to the eNB. Unfortunately, while this may be useful in an environment in which the path loss changes relatively slowly, this may not be amenable to dynamic switching, in which it may be desirable for the transmission power to change substantially when the UE 502 transmission switches between the serving cell and the transmission point.

To combat this, the UL DCI in the PDCCH received by the UE 502 at operation 718 may indicate which of the UL PUSCH parameter sets to use for communication. The UL PUSCH parameter set may include the downlink reference signal (e.g. DRS or CRS) to be used by the UE 502 to determine the path loss. This selection of a set of downlink reference signals for one eNB independent of the set of downlink reference signals used for another eNB, i.e., the downlink reference signals may be the same or may be different. The actual uplink transmission power for PUSCH transmission may be calculated by the UE 502 using open-loop power control equations provided in Technical Specification (TS) 36.213 v.12.5.0. The UL PUSCH parameter set indicated by the DCI may also include one or more TA values, where each TA may be configured using legacy MAC signaling. The actual TA that that may be used by the UE 502 to receive the PUSCH transmission may be indicated in the DCI.

In some embodiments, the DCI may indicate a transmission power to use. The transmission power may be based on the reference signal used by the UE 502 to estimate the path loss. The DCI may contain an index indicating which UL PUSCH parameter set to use, and each UL PUSCH parameter set may also be associated with a particular initial transmission power and TA associated with that DCI index. In some embodiments, the DCI format may contain one or more bits in a new field to indicate the power level and one or more bits in another field to indicate the TA. In some embodiments, the serving cell 512 may transmit a DCI format 0 or 4, which may contain the power control information.

A similar embodiment to support seamless mobility may be configured for uplink control and SRS. More specifically, one or more SRS transmission parameters may be configured for the UE 502 using higher layer signaling. The actual transmission set for SRS transmission may be selected by the UE 502 based on DCI triggering the SRS transmission.

The SRS transmission parameters may include a TA and downlink reference signal (DRS or CRS) to be used to derive the path loss for the uplink transmit power equation described in TS 36.213 v.12.5.0.

After determining the appropriate UL PUSCH parameter set to use from the DCI, the UE 502 may transmit the indicated reference signals. The UE 502 may then estimate the path loss and calculate the transmission power, as well as determine the TA to use, from a response from the cell indicated in the UL PUSCH parameter set. The UE 502 may subsequently, at operation 720 transmit PUSCH data to the cell indicated in the UL PUSCH parameter set using the calculated transmission power and TA.

FIG. 6 illustrates CoMP using multiple Fast Fourier Transform (FFT) processes in accordance with some embodiments. Rather than relying on post-FFT synchronization, in which the FFT of the serving cell 610 (e.g., eNB 512 in FIG. 5) and transmission point 620 (e.g., eNB 522 in FIG. 5) partially overlap the CP, as shown in FIG. 6, the constraint between the FFT window 614, 624 and the CP 612, 622 is more relaxed. The FFT window 614, 624 may include a PDSCH symbol to be processed by the FFT and other components, for example, to demodulate the PDSCH symbol to baseband and decode the PDSCH symbol. As shown, the FFT window 614 and CP 612 of the serving cell 610 may be permitted to entirely overlap the FFT window 624 and the CP 622 of the transmission point 620 as the UE may be able to switch between receiving signals from the serving cell 610 and the transmission point 620.

The UE may thus perform control channel monitoring using multiple synchronization sources with more than one FFT processing. The UE may be configured with one or more PDCCH, PDSCH and/or PUSCH sets, where each PDCCH and PDSCH set may be configured with a PSS and SSS and DRS (or other reference signal) corresponding to the transmission source and each PUSCH may be configured with a reference signal to use for path loss estimation and transmission power calculation and TA. Based on the configuration, the UE may perform PDCCH demodulation using pre-FFT processing in accordance with the timing and frequency offsets derived from the reference signals and PUSCH transmission based on the calculated transmission power and TA.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of user equipment (UE), the apparatus comprising:
    processing circuitry arranged to:
        decode a plurality of parameter sets each associated with a different evolved NodeB (eNB), the parameter sets comprising at least one of downlink (DL) parameter sets and uplink (UL) parameter sets; and
        in response receipt of the DL parameter sets:
            decode reference signals associated with one of the eNBs based on a DL parameter set associated with the one of the eNBs;
            determine a timing and frequency offset for communications with the one of the eNBs based on the reference signals received from the one of the eNBs; and
            use the timing and frequency offset to decode a dynamically switched physical downlink shared channel (PDSCH) indicated by a physical downlink control channel (PDCCH), the dynamically switched PDSCH selected from among PDSCHs provided by different eNBs; and
    a memory configured to store the parameter sets.

2. The apparatus of claim 1, wherein the processing circuitry is further arranged to:
    decode reference signals associated with another of the eNBs based on a DL parameter set associated with the other of the eNBs, and
    determine a timing and frequency offset for DL communications with the other of the eNBs based on the reference signals received from the other of the eNBs,
    wherein the timing and frequency offset associated with the one of the eNBs are independent of the timing and frequency offset associated with the other of the eNBs.

3. The apparatus of claim 1, wherein the processing circuitry is further arranged to:
    decode the PDCCH from a same eNB independent of an eNB from which the dynamically switched PDSCH is received.

4. The apparatus of claim 3, wherein:
    the PDCCH comprises downlink control information (DCI), the DCI comprising an indication of which PDSCH of the PDSCHs from different eNBs to decode as the dynamically switched PDSCH.

5. The apparatus of claim 1, wherein:
    each DL parameter set is associated with a different one of the eNBs and comprises information associated with a different PDCCH, including reference signal information, and
    the processing circuitry is further arranged to decode different PDCCHs from the different eNBs, each PDCCH indicating a different PDSCH for the transceiver to detect, based on the associated DL parameter set, the PDCCHs from the different eNBs configured to be received using a same set of frequency resources.

6. The apparatus of claim 1, wherein:
    the PDCCH comprises an enhanced PDCCH (ePDCCH).

7. The apparatus of claim 1, wherein:
    each DL parameter set comprises information of at least one of:
        a Primary Synchronization Signal (PSS) and Secondary Synchronization Signal (SSS), and
        Discovery Reference Signals (DRS).

8. The apparatus of claim 1, wherein the processing circuitry is further arranged to:
    decode the parameter sets in an RRCConnectionReconfiguration message, which is downconverted to baseband by mixer circuitry prior to the transceiver configured to receive the reference signals.

9. The apparatus of claim 1, wherein:
    in response to the parameter sets comprising UL parameter sets, the processing circuitry is further arranged to decode downlink control information (DCI) in the PDCCH, the DCI indicating which of the UL parameter sets for the UE to use.

10. The apparatus of claim 9, wherein:
    each UL parameter set is associated with a different one of the eNBs and comprises a downlink reference signal to use to determine path loss between the UE and an associated eNB and a timing advance value to use in communications with the associated eNB.

11. The apparatus of claim 9, wherein:
    each UL parameter set is associated with a different one of the eNBs and comprises sounding reference signal (SRS) parameters to use for transmission of a SRS.

12. The apparatus of claim 1, wherein:
    the processing circuitry comprises baseband circuitry and is further arranged to adjust a Fast Fourier Transform (FFT) window for the PDSCH based on the reference signals such that a timing offset relative to an orthogonal frequency division multiplexed (OFDM) symbol boundary is within a timing offset range of −0.5 to 2 μsec.

13. The apparatus of claim 1, further comprising:
a plurality of antennas configured to provide communications between the transceiver and the eNBs.

14. An apparatus of an evolved NodeB (eNB), the apparatus comprising:
processing circuitry arranged to:
encode, for transmission to a user equipment (UE) in an RRCConnectionReconfiguration message, a plurality of parameter sets each associated with a different eNB of a plurality of eNBs, the parameter sets comprising downlink (DL) parameter sets and uplink (UL) parameter sets, each DL parameter set comprising information of a Primary Synchronization Signal (PSS), a Secondary Synchronization Signal (SSS) and Discovery Reference Signals (DRS), each parameter set to configure the UE for reception of a dynamically switched physical downlink shared channel (PDSCH); and
encode, for transmission to the UE, a physical downlink control channel (PDCCH) subsequent to transmission of the RRCConnectionReconfiguration message; and
a memory configured to store the plurality of parameter sets.

15. The apparatus of claim 14, wherein the processing circuitry is further arranged to:
encode, for transmission to the UE, the dynamically switched PDSCH indicated by the PDCCH.

16. The apparatus of claim 14, wherein:
the PDCCH comprises downlink control information (DCI), the DCI comprising an indication of which PDSCH of different PDSCHs from different eNBs to decode as a dynamically switched PDSCH.

17. The apparatus of claim 14, wherein:
each DL parameter set is associated with a different one of the eNBs and comprises information associated with a different PDCCH, including reference signal information, and
each PDCCH indicates a different PDSCH for the transceiver to detect, based on the associated DL parameter set, the PDCCHs using a same set of frequency resources.

18. The apparatus of claim 14, wherein:
the PDCCH comprises an enhanced PDCCH (ePDCCH).

19. The apparatus of claim 14, wherein:
the processing circuitry is further arranged to encode, for transmission to the UE, downlink control information (DCI) in the PDCCH, the DCI indicating which of the UL parameter sets to use.

20. The apparatus of claim 19, wherein:
each UL parameter set is associated with a different one of the eNBs and comprises a downlink reference signal to use to determine path loss between the UE and an associated eNB and a timing advance value to use in communications with the associated eNB.

21. The apparatus of claim 20, wherein:
each UL parameter set is associated with a different one of the eNBs and comprises sounding reference signal (SRS) parameters to use for transmission of an SRS.

22. A non-transitory computer-readable storage medium that stores instructions for execution by one or more processors of user equipment (UE) to communicate with a plurality of evolved NodeBs (eNBs) in a Coordinated Multipoint (CoMP) network, the one or more processors to configure the UE to:
receive, in an RRCConnectionReconfiguration message, a plurality of downlink (DL) parameter sets each associated with a different one of the eNBs and comprising reference signal information for a Primary Synchronization Signal (PSS), a Secondary Synchronization Signal (SSS) and Discovery Reference Signals (DRS);
receive reference signals associated with one of the eNBs based on a DL parameter set associated with the one of the eNBs;
determine a timing and frequency offset for communications with the one of the eNBs based on the reference signals received from the one of the eNBs; and
use the timing and frequency offset to decode a dynamically switched physical downlink shared channel (PDSCH) of the CoMP network indicated by a physical downlink control channel (PDCCH), the dynamically switched PDSCH selected from among PDSCHs provided by different eNBs.

23. The medium of claim 22, wherein the instructions further configure the UE to:
receive the PDCCH from a same eNB independent of an eNB from which the dynamically switched PDSCH is received, the PDCCH comprising downlink control information (DCI), the DCI comprising an indication of which PDSCH of different PDSCHs from different eNBs to decode as the dynamically switched PDSCH.

24. The medium of claim 22, wherein:
each DL parameter set is associated with a different one of the eNBs and comprises information associated with a different PDCCH, including reference signal information, and
the instructions further configure the UE to receive different PDCCHs from different ones of the eNBs, each PDCCH indicating a different PDSCH for the transceiver to detect, based on the associated DL parameter set, the PDCCHs from the different eNBs configured to be received using a same set of frequency resources.

25. The medium of claim 22, wherein the instructions further configure the UE to:
receive a plurality of UL parameter sets in the RRCConnectionReconfiguration message, each UL parameter set associated with a different one of the eNBs and comprising a downlink reference signal to use to determine path loss between the UE and an associated eNB and a timing advance value to use in communications with the associated eNB, and
receive downlink control information (DCI) in the PDCCH, the DCI indicating which of the UL parameter sets to use.

* * * * *